(12) United States Patent
Schaffer

(10) Patent No.: US 12,302,886 B1
(45) Date of Patent: May 20, 2025

(54) ROTARY INSECT TRAP

(71) Applicant: George Wesley Schaffer, Skull Valley, AZ (US)

(72) Inventor: George Wesley Schaffer, Skull Valley, AZ (US)

( * ) Notice: Subject to any disclaimer, the term of this patent is extended or adjusted under 35 U.S.C. 154(b) by 0 days.

(21) Appl. No.: 18/606,026

(22) Filed: Mar. 15, 2024

(51) Int. Cl.
*A01M 1/10* (2006.01)
*A01M 1/02* (2006.01)

(52) U.S. Cl.
CPC .............. *A01M 1/10* (2013.01); *A01M 1/02* (2013.01)

(58) Field of Classification Search
CPC ............ A01M 1/02; A01M 1/06; A01M 1/10; A01M 1/106; A01M 5/00; A01M 5/02; A01M 5/04; A01M 5/08; A01M 1/2005; A01M 1/2001; A01M 1/2016; A01M 1/2033
USPC ................ 43/107, 111, 132.1, 133, 138, 139
See application file for complete search history.

(56) References Cited

U.S. PATENT DOCUMENTS

| | | | | |
|---|---|---|---|---|
| 1,693,368 A | * | 11/1928 | Cherry ................... | A01M 1/08 |
| | | | | 55/510 |
| 4,438,585 A | * | 3/1984 | Slatton ................... | A01M 1/02 |
| | | | | 43/132.1 |
| 4,519,160 A | * | 5/1985 | McBrayer .............. | A01M 1/04 |
| | | | | 43/138 |
| 5,209,010 A | * | 5/1993 | Vickery .................. | A01M 1/02 |
| | | | | 43/139 |
| 5,501,034 A | * | 3/1996 | Hazan .................... | A01M 1/103 |
| | | | | 43/138 |
| 2005/0060926 A1 | * | 3/2005 | Lee ........................ | A01M 1/08 |
| | | | | 43/139 |
| 2005/0160659 A1 | * | 7/2005 | Forehand .............. | A01M 1/106 |
| | | | | 43/107 |
| 2007/0011940 A1 | * | 1/2007 | Chen ..................... | A01M 1/023 |
| | | | | 43/107 |
| 2008/0236028 A1 | * | 10/2008 | McBride ............... | A01M 1/023 |
| | | | | 43/107 |
| 2017/0258068 A1 | * | 9/2017 | Eom ...................... | A01M 1/106 |
| 2018/0116195 A1 | * | 5/2018 | Zhang .................... | F21K 9/232 |
| 2018/0213763 A1 | * | 8/2018 | Lee ........................ | F21V 23/00 |
| 2019/0008132 A1 | * | 1/2019 | Eom ...................... | A01M 1/06 |
| 2019/0090470 A1 | * | 3/2019 | Lee ........................ | A01M 1/04 |

* cited by examiner

*Primary Examiner* — Joshua J Michener
*Assistant Examiner* — Nicole Paige Maccrate
(74) *Attorney, Agent, or Firm* — Bruce A. Lev

(57) ABSTRACT

A rotary insect trap for hitting, disabling, and collecting insects within a feeder tray without killing them or mutilating their bodies. The insects are then funneled into an animal pen and used as feed for small animals, such as chickens and ducks. The rotary insect trap includes a housing, a rotary motor, insect bait, a tray, and a spinning wire adapted to be rotated by the rotary motor within the housing at a speed intended to knock insects into the tray after they have been lured into the housing by the bait attached thereon.

16 Claims, 5 Drawing Sheets

ROTARY INSECT TRAP

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to insect traps, and more specifically to rotary insect traps used to feed small animals.

2. Description of the Related Art

Prior art insect traps are designed to kill insects and dispose of their bodies. Some prior art insect traps incorporate spinning blades that are adapted to hit and mutilate insects to ensure their death and reduce the volume of insect bodies before disposal. The resulting mutilated insect bodies do not make for healthy animal food especially when they are not used for feed right away and start rotting. Accordingly, the present invention overcomes the disadvantages associated with the prior art, by providing a rotary insect trap for hitting, disabling, and collecting insects within a feeder tray without killing them or mutilating their bodies.

BRIEF SUMMARY OF THE INVENTION

In view of the foregoing disadvantages inherent in the known types of insect traps or the like in the prior art, the present invention provides a rotary insect trap for hitting, disabling, and collecting insects within a feeder tray without killing them or mutilating their bodies. The insects are then funneled into an animal pen and used as feed for small animals, such as chickens and ducks. The rotary insect trap includes a housing, a rotary motor, insect bait, a tray, and a spinning wire adapted to be rotated by the rotary motor within the housing at a speed intended to knock insects into the tray after they have been lured into the housing by the bait attached thereon.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
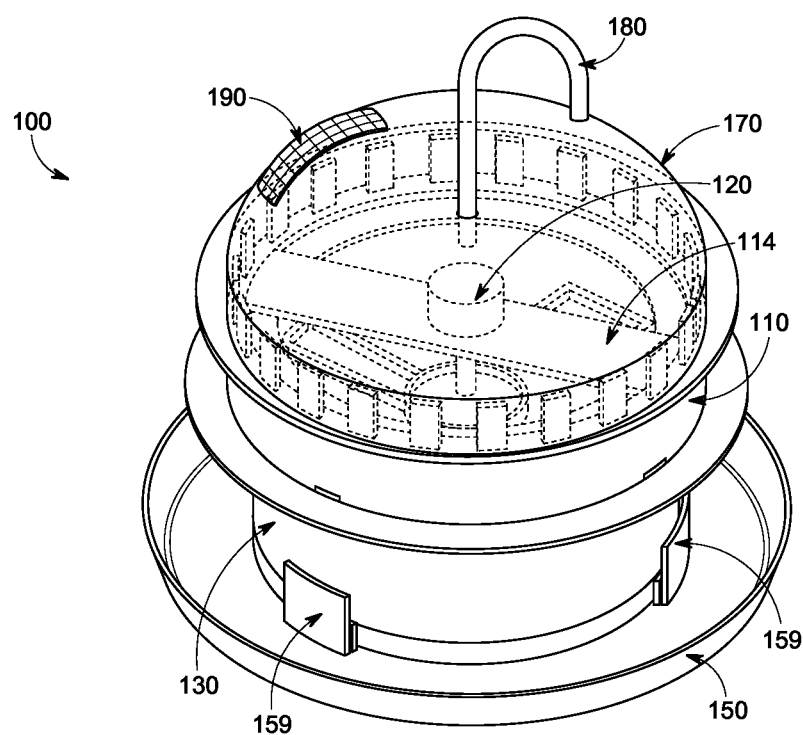
FIG. 1 shows a perspective view of the rotary insect trap according to the preferred embodiment of the present invention.
Figure 2:
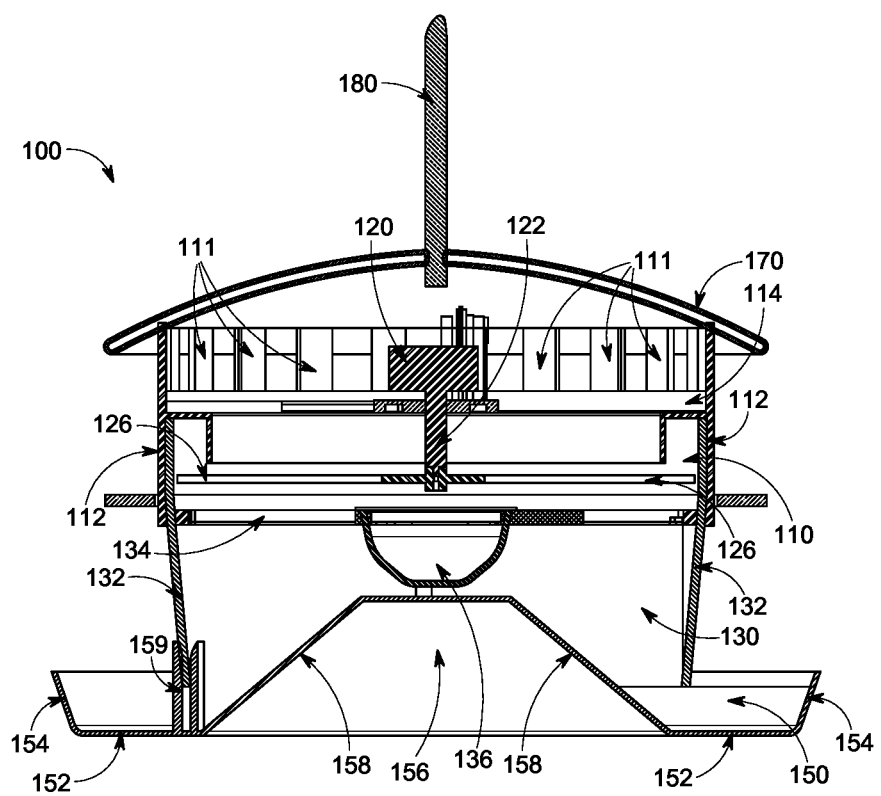
FIG. 2 shows a cross sectional view of the rotary insect trap according to the preferred embodiment of the present invention of FIG. 1.
Figure 3:
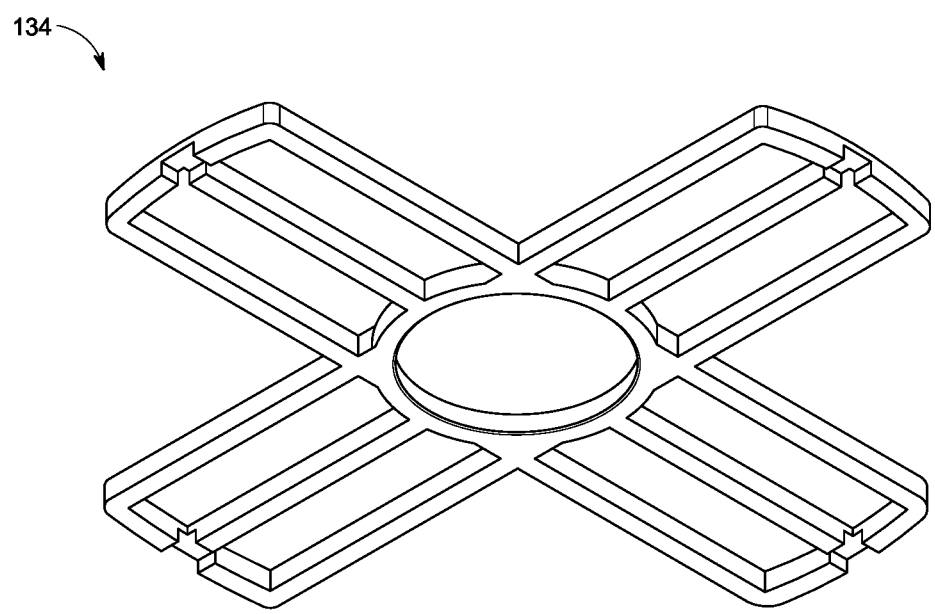
FIG. 3 shows a perspective view of the bait frame of the rotary insect trap according to the preferred embodiment of the present invention of FIG. 1.
Figure 4:
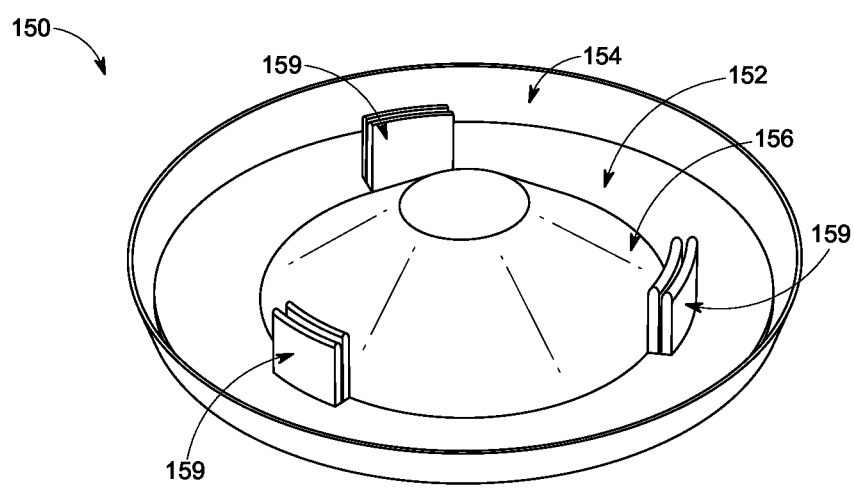
FIG. 4 shows a perspective view of the tray of the rotary insect trap according to the preferred embodiment of the present invention of FIG. 1.
Figure 5:
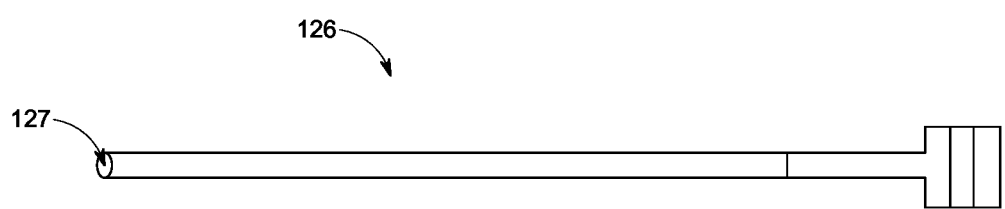
FIG. 5 shows a perspective view of the wire of the rotary insect trap according to the preferred embodiment of the present invention of FIG. 1.

Turning now descriptively to drawing, referring to FIGS. 1-5, the present invention discloses a rotary insect trap 100 comprising a motor housing 110 including a side wall 112 including openings 111 therethrough for allowing insects to pass therethrough, and defining an external radius and forms an interior volume, a motor frame 114 located within the interior volume of the motor housing and is attached to the side wall and is adapted to extend along the width of the interior volume of the motor housing; a motor 120 including an axle 122, wherein the motor is attached to a center portion of the motor frame, and wherein the axle extends downwardly from the motor and below the motor frame; a wire 126 attached to the axle 122 at a distal end thereof, extends horizontally towards the side wall 112, and is adapted to rotate within the interior volume of the motor housing 110, and wherein the wire 126 is adapted to rotate at a speed configured to hit and disable insects that have flown into the interior volume of the motor housing through openings 111; a bait housing 130 including a side wall 132 defining an external radius and forms an interior volume, wherein the side wall 132 is connected to a lower portion of the motor housing 110 and extends downwardly therefrom; a bait frame 134 located within the interior volume of the bait housing and is attached to the side wall 132 and is adapted to extend along the width of the interior volume of the bait housing 130, a bait holder 136 attached to a center portion of the bait frame 134 and extends downwardly therefrom; a tray 150 including a bottom wall 152, and a side wall 154 attached to a side edge of the bottom wall 152 and extends upwardly therefrom, wherein the bottom wall 152 and the side wall 154 form an external radius larger that the external radiuses of the motor housing and the bait housing, and a center cone 156 including an inclined external surface 158, wherein the center cone 156 is attached to a center portion of the bottom wall 152 and extends upwardly therefrom, wherein the inclined external surface 158 is adapted to redirect falling insect bodies outwardly from the center portion of the bottom wall, and at least one connector 159 attached to the bottom wall adjacent the center cone 156 and extends upwardly therefrom and is adapted to attach to a lower portion of the side wall of the bait housing 130; and a cover 170 adapted to attach to a top portion of the side wall 112 of the motor housing 110 and cover the interior volume of the motor housing.

The rotary insect trap 100 is adapted such that the motor 120 rotates the wire 126 at a chosen speed intended to hit insects, disable them, and knock them down and into the tray after they have been lured into the housing by bait placed within the bait holder 136. In the preferred embodiment, the wire 126 is rotated by the motor within a rotational speed range of 1500 rpm to 3500 rpm. Within this range of rpm's the wire functions to hit insects, disable them, and knock them down and into the tray 150 without killing the insects or mutilating their bodies. Preferably, the wire 126 is formed from a copper, steel, aluminum, or high carbon fiber, although other materials can be used, and which has a circular cross-section 127. The optimal diameter of the wire is 0.020 inches, and in some applications the wire is formed having a length of 81 mm, although other lengths and diameters can be used based upon the optimal dimensions of the motor housing and bait housing being used. Once the insects are disabled and laying in the tray 150, they are collected and used to feed small animals, such as chickens and ducks. In an alternate embodiment there can be two wires 126 attached to the axle 122 at distal ends thereof, extend horizontally in opposite directions towards the side wall 112, and are adapted to rotate within the interior volume of the motor housing 110. In another alternate embodiment there can be four wires 126 attached to the axle 122 at distal ends thereof, extend horizontally in 90 degree angles to one another towards the side wall 112, and are adapted to rotate within the interior volume of the motor housing 110. As such, the plurality of wires balance themselves with respect to one another when rotating.

In the preferred embodiment, the inclined external surface 158 of said center cone 156 of said tray 150 is formed having an angle with respect to the bottom wall 152 of between 45 degrees and 70 degrees, with the most effective angle knocking the falling bodies of the insects into an area on the bottom wall adjacent the side wall 154 being 55 degrees. In the preferred embodiment, the radius of the side wall 154 is larger than the radiuses of the motor housing and the bait housing such that a user can grab and remove the insect bodies lying in the tray adjacent the side wall 154.

The rotary insect trap 100 further comprising an attachment member 180, which can be formed as a hook, is connected to a top portion of the cover and is adapted to releasably hang the rotary insect trap from a support member.

The motor 120 is formed as an electric motor, which can be powered from an electric cord, or in an alternate embodiment, power to the electric motor can be generated and sent via a solar panel 190 attached to a top surface of the cover.

In the preferred embodiment, the bait holder 136 is formed having a cup-shape, and bait is placed within the bait holder. The bait can be formed from various materials, however in the preferred embodiment the bait is formed from yeast and other proteins, which causes a smell that attracts insects. Further, the bait can be mixed with water, which has been found to increase the attraction of the bait by insects. Furthermore, bait can be attached to other portions of the bait housing 130 and the bait frame 134 to further attract insects.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A rotary insect trap comprising:
   a motor housing including:
      a side wall including:
         openings therethrough for allowing insects to pass therethrough;
         wherein said side wall defines an external radius and forms an interior volume;
      a motor frame;
         wherein said motor frame is located within an interior volume of said motor housing and is attached to said side wall and adapted to extend along a width of said interior volume of said motor housing;
   a motor including:
      an axle;
      wherein said motor is attached to a center portion of said motor frame; and
      wherein said axle extends downwardly from said motor and below said motor frame;
   a wire;
      wherein said wire is attached to said axle at a distal end thereof, extends horizontally towards said side wall, and is adapted to rotate within said interior volume of said motor housing; and
      wherein said wire is adapted to rotate at a speed configured to hit and disable insects that have flown into said interior volume of said motor housing;
   a bait housing including:
      a side wall;
         wherein said side wall defines an external radius and forms an interior volume; and wherein said side wall is connected to a lower portion of said motor housing and extends downwardly therefrom;
      a bait frame:
         wherein said bait frame is located within an interior volume of said bait housing and is attached to said side wall and adapted to extend along a width of said interior volume of said bait housing;
      a bait holder;
         wherein said bait holder is attached to a center portion of said bait frame and extends downwardly therefrom;

a tray including:
  a bottom wall; and
  a side wall;
    wherein said side wall is attached to a side edge of said bottom wall and extends upwardly therefrom;
  wherein said bottom wall and said side wall form an external radius larger that said external radiuses of said motor housing and said bait housing; and
  a center cone including:
    an inclined external surface;
    wherein said center cone is attached to a center portion of said bottom wall and extends upwardly therefrom;
    wherein said inclined external surface is adapted to redirect falling insect bodies outwardly from said center portion of said bottom wall; and
  at least one connector;
    wherein said at least one connector is attached to said bottom wall adjacent said center cone and extends upwardly therefrom and is adapted to attach to a lower portion of said side wall of said bait housing; and
a cover;
  wherein said cover is adapted to attach to a top portion of said side wall of
  said motor housing and cover said interior volume of said motor housing;
wherein said rotary insect trap is adapted such that said motor rotates said wire at a chosen speed intended to hit insects, disable them, and knock them into the tray after they have been lured into the housing by bait placed within said bait holder.

2. The rotary insect trap of claim 1, wherein said motor is an electric motor.

3. The rotary insect trap of claim 2, further comprising at least one solar panel adapted to be attached to a top surface of said cover and supply electric power to said motor.

4. The rotary insect trap of claim 1, wherein said bait is formed from a protein.

5. The rotary insect trap of claim 4, wherein said protein is yeast.

6. The rotary insect trap of claim 1, further comprising a second wire, wherein said second wire is attached to said axle at a distal end thereof, extends horizontally towards said side wall opposite said wire, and is adapted to rotate within said interior volume of said motor housing.

7. The rotary insect trap of claim 6, wherein said second wire has a circular cross-section.

8. The rotary insect trap of claim 1, wherein said inclined external surface of said center cone of said tray is formed having an angle with respect to said bottom wall of between 45 degrees and 70 degrees.

9. The rotary insect trap of claim 8, wherein said angle is 55 degrees.

10. The rotary insect trap of claim 1, further comprising an attachment member connected to a top portion of said cover and adapted to releasably hang said rotary insect trap from a support member.

11. The rotary insect trap of claim 1, wherein said attachment member is formed as a hook.

12. The rotary insect trap of claim 1, wherein said wire is rotated by said motor within a rotational speed range of 1500 rpm to 3500 rpm.

13. The rotary insect trap of claim 1, wherein said wire is formed from a material chosen from a group of materials consisting of copper, steel, aluminum and high carbon fiber.

14. The rotary insect trap of claim 1, wherein said bait holder is formed having a cup-shape.

15. The rotary insect trap of claim 1, further comprising bait adapted to be placed within said bait holder.

16. The rotary insect trap of claim 1, wherein said wire has a circular cross-section.

* * * * *